United States Patent [19]
McNaney

[11] 3,960,440
[45] June 1, 1976

[54] LIGHT OPTIC DATA HANDLING SYSTEM
[76] Inventor: Joseph T. McNaney, 8548 Boulder Drive, La Mesa, Calif. 92041
[22] Filed: May 27, 1975
[21] Appl. No.: 580,586

[52] U.S. Cl. .............................. 350/161; 350/96 C
[51] Int. Cl.² ............................................ G02F 1/34
[58] Field of Search ............... 350/161, 96 WG; 331/94.5 M

[56] References Cited
UNITED STATES PATENTS 3,790,898   2/1974   Gudmundson et al. .............. 350/161
3,919,669   11/1975  Hartemann ......................... 350/161

*Primary Examiner*—William L. Sikes

[57] ABSTRACT

The system herein includes light optic means which functions as a light beam distributor in making available, almost instantly, an information bearing beam of light at a plurality of differently positioned output paths of the system as opposed to the conventional or more well known line scan beam deflection systems.

10 Claims, 4 Drawing Figures

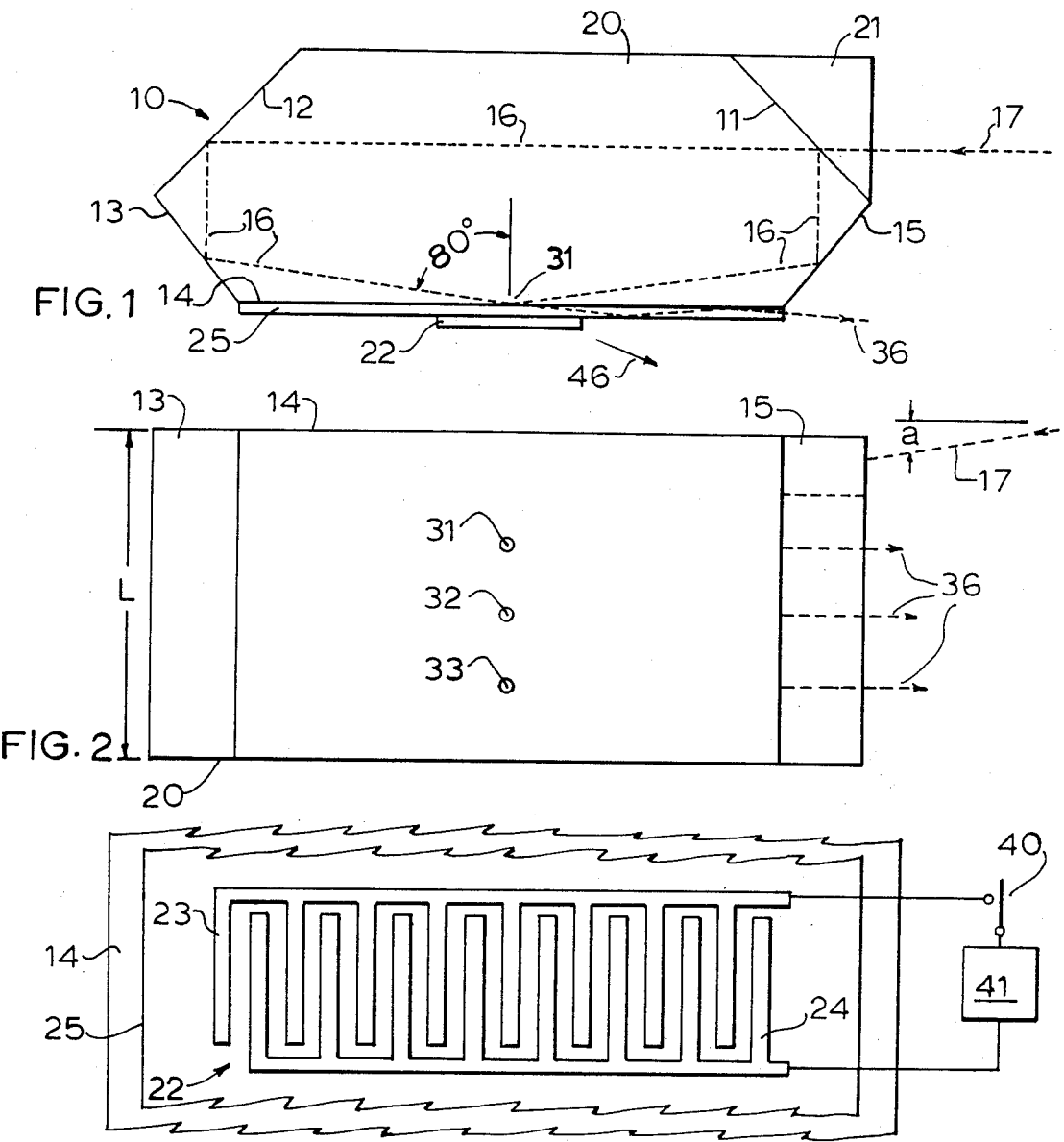
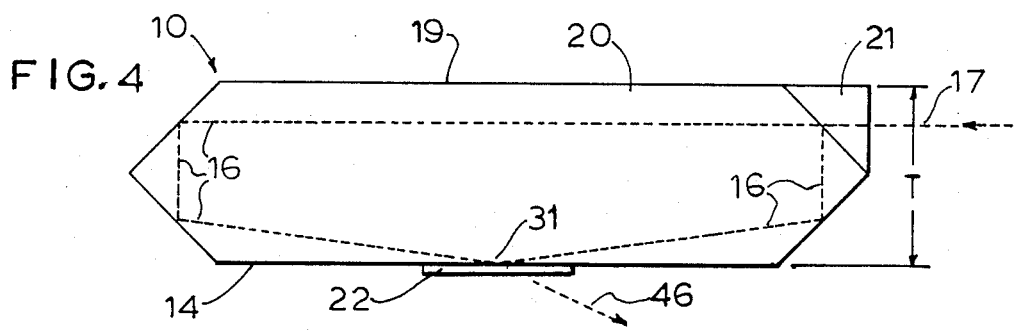

LIGHT OPTIC DATA HANDLING SYSTEM

SUMMARY OF THE INVENTION

An information bearing light beam is directed along a primary optical path by means of a series of reflections entirely within a light guide of piezoelectric material and made readily available for a redirecting thereof along secondary paths, selectively, from any of a number of controllable light reflecting positions in the system. Closely adjacent each said position there is an interdigital periodic electrode structure. In response to the application of a voltage to such structure an electric field thereof effects a periodic strain in the material and a periodic variation in the index of refraction which serves as a diffraction grating at a selected position for frustrating light reflections thereat and thereupon allowing light to be directed along a predetermined secondary path. The light beam, or information contained therein, in combination with its output position, may thereupon be utilized in communications or for data handling purposes.

It is an object of the invention to effect light beam positioning or distribution control independent of the control system stability of more conventional beam deflection methods. These and other objects, features, and advantages of the invention will best be understood from the description which follows when read in connection with the accompanying drawing.

BRIEF DESCRIPTION OF THE DRAWING

FIGS. 1 and 2 are first and second views of a light beam positioning system of the invention;

FIG. 3 is a diagrammed detail of an electrode structure and light beam path control means of the invention.

DETAILED DESCRIPTION OF THE INVENTION

Referring now to FIGS. 1 and 2 the positioning system 10 is illustrated to include, for example, a light guide of piezoelectric material having five longitudinally extending light reflecting surfaces, having a length L, and will be referred to as a light guide 20. Closely adjacent to one side 11 thereof there is shown a prism 21. Light, preferably from a laser source, is directed along a path 17 at an angle $a$, as indicated in FIG. 2. The angle indicated has been exaggerated, however, as well as the dimensions of all of the illustrations, so as to simplify the discussion of the invention. Upon entering the light guide 20 the beam of light will be directed along, what will be referred to as, a primary optical path 16 by means of the light reflecting surfaces 12, 13, 14 and 15, and then again by surfaces 11, 12, etc., spiralling its way through the length dimension of the guide 20, so as to provide a series of 360° optical paths each displaced one with respect to the other in a side-by-side relationship. The object is to have the beam appear at each of a series of deflection points, positions 31, 32, 33, etc., along the deflection surface 14 in the direction of its length dimension L.

The light guide 20 may be made of any of a number of clear light conducting piezoelectric materials, such as quartz, tourmaline, barium titanate, lithium niobate, or like materials. The angular relationship of the reflecting surfaces 11, 12, 13, 14 and 15 of the light guide 20 is designed to provide an angle of incidence of 80° for the beam incident upon the reflecting surface 14. Although this is a preferred angle of incidence with respect to surface 14 the design is not to be limited in this regard.

An interdigital electrode assembly 22 illustrated in FIG. 3 comprised of electrodes 23 and 24 are supported closely adjacent to the surface 14 of the light guide 20. Intermediate the electrode assembly 22 and the surface 14, and intimately joined therewith, there is a thin film 25 of light conducting material, such as glass, having an index of refraction lower than the index of refraction of the light guide material. As indicated in FIG. 1, but not shown in FIG. 2, an electrode assembly 22 is positioned at each of the deflection positions 31, 32, 33, etc. Upon the application of a voltage to one of the assemblies 22, by means of a switch 40 from a voltage source 41, fringing electric fields established between the fingers thereof produces a periodic strain in, and at the interface of, the guide 20 and film 25 materials. This compressional strain at the interface of these materials produces a spatially periodic variation of the index of refraction of the materials, thereby providing a diffraction grating at the point of incidence of the light. The established grating thereupon redirects light from the primary path 16 and along a secondary path beyond the light reflecting limits of the light guide 20.

As illustrated in FIG. 1, the film 25 may be utilized as a light guide for directing light toward any of a number of secondary paths 36 stemming from each of the positions 31, 32, 33 as indicated in FIG. 2. However, the dimensions of the electrode assemblies may be extended sufficiently beyond the deflection positions so as to allow the effects of the grating to pass light through the film 25 and grating and along secondary paths 46.

In FIG. 4 embodiment the electrode assembly 22 is joined directly to the surface 14 of the light guide material 20. The electrodes 23 and 24 may be of an electrically conductive light transparent material having an index of refraction lower than that of the light guide 20 index and in the space between the fingers of the electrodes there will be a transparent dielectric material having the same index of refraction as that of the electrodes. The assembly will thereby not affect the reflection of light at the surface 14 within the light guide 20 until a voltage is connected between the electrodes thereof. Depending upon the thickness T of the light guide 20 of the invention an electrode in the form of a plate (not shown) may be deposited on a surface 19 and but one of the electrodes, electrode 23 for example, may be supported at each of the deflection points 31, 32, etc. for effecting a periodic compressional strain at the surface 14 in response to the extending of the influence of a voltage between the electrode 23 and plate.

The light beam distributor means herein, because of the nature of its fabrication possibilities, can be utilized compatibly with integrated optical data processing systems. However, it should be understood by those skilled in the arts pertaining to the construction and application possibilities of the invention herein set forth that the embodiments included herein illustrate in a very limited sense the usefulness of the invention and that it includes such other modifications and equivalents as may be seen by those skilled in the arts, but still be within the scope of the appended claims.

I claim:

1. A piezoelectric optical material light guide and light beam distributor means, comprising:

a. said light guide presenting a light admitting surface;
b. means for directing light incident upon said admitting surface along a primary optical path within said light guide while undergoing a series of reflections therein to establish an availability of light at a plurality of predetermined light output positions of said light guide for an optically controlled redirecting of light along a selected one of a plurality of secondary optical paths stemming from said positions;
c. said light guide having an array of light reflecting interfaces of first and second light conducting media presenting, respectively, first and second indices of refraction, each of said interfaces presenting a length dimension;
d. said light reflecting interfaces each angularly oriented so as to establish an optical relationship one with respect to the other and to said admitting surface for providing a series of 360° primary optical paths for said light, each said 360° path displaced one with respect to the other in a side-by-side relationship in the direction of said length dimension;
e. a plurality of light reflection control means for establishing, selectively, periodic strains in said piezoelectric material coincident with the interface of said first and second media at each of said light output positions and producing thereat a spatially varying change in the index of refraction of the material for effecting a passing of light through the interface at a selected one of said output positions and along a secondary optical path stemming from said position.

2. The invention as set forth in claim 1 wherein
f. each said light reflection control means is a spatially periodic interdigital electrode assembly and means for connecting a voltage thereto, said assembly consisting of first and second electrodes supported closely adjacent to said light guide material at each of said light output positions.

3. The invention as set forth in claim 2 additionally including
g. a film of light conducting material intermediate the electrode assembly and the light guide material and intimately joined therewith, said film having a predetermined thickness dimension and an index of refraction lower than that of the light guide material and means for extending a spatially varying change in the index of refraction thereof upon said establishing of periodic strains in said piezoelectric material.

4. The invention as set forth in claim 1 wherein
f. each said light reflection control means is a spatially periodic interdigital electrode assembly and means for connecting a voltage thereto, said assembly consisting of first and second electrodes, the first electrode supported closely adjacent to said light guide material at each of said light output positions and the second electrode supported adjacent a side of said light guide material directly opposite said first electrode.

5. The invention as set forth in claim 4 additionally including
g. a film of light conducting material intermediate said first electrode and the light guide material and intimately joined therewith, said film having a predetermined thickness dimension and an index of refraction lower than that of the light guide material and means for extending a spatially varying change in the index of refraction thereof upon establishing of periodic strains in said piezoelectric material.

6. A light optic data handling system, comprising:
a. a source of voltage;
b. a source of light and means for directing light therefrom along a primary optical path while undergoing a series of reflections within said system and to establish an availability of light from said source at a plurality of predetermined light output positions of said system for an optically controlled redirecting of light along a selected one of a plurality of secondary optical paths stemming from said positions;
c. said means including an array of light reflecting interfaces of first and second light conducting media presenting, respectively, first and second indices of refraction, each of said interfaces presenting a length dimension, the first media of said first and second light conducting media coincident with the output positions along said length dimension includes a material presenting a surface at said interface exhibiting a piezoelectric effect in response to the application of the influence of an electrical potential thereto from said source;
d. said interfaces each angularly oriented so as to establish an optical relationship one with respect to the other and to the path of light from said source for providing a series of 360° primary optical paths for said light, each said 360° path displaced one with respect to the other in a side-by-side relationship in the direction of said length dimension;
e. a plurality of light reflection control means for extending said influence to said surface for establishing, selectively, periodic strains at the surface of said material at each of the light output positions and producing thereat a spatially varying change in the index of refraction for effecting a passing of light through the interface and thereupon along a secondary optical path stemming from said light output position.

7. The invention as set forth in claim 6 wherein
f. each said light reflection control means is an electrode assembly having means for connecting an electrical potential thereto from said source, electrodes of said assembly being adjacent the surface of said material at each of said output positions along said length dimension;
g. a film of light conducting material intermediate said surface and the electrodes adjacent thereto and intimately joined therewith, said film having a predetermined thickness dimension and an index of refraction lower than the index of said material to which it is joined.

8. A light beam reflection control device, comprising:
a. a source of voltage;
b. a light guide of light conducting material presenting a light admitting surface and at least first and second light output surface;
c. means for directing light incident upon said admitting surface along a primary optical path within said light guide extending to said first output surface while undergoing at least one light reflection therein and establishing an availability of light at said second output surface for an optically controlled redirecting of light along a secondary path stemming from said second surface;

d. said light guide presenting an interface of first and second light conducting media and presenting, respectively, first and second indices of refraction coincident with said second output surface, said first media includes a material presenting a surface at said interface exhibiting a piezoelectric effect in response to the application of the influence of an electrical potential thereto from said source;

e. light reflection control means for extending said influence to said second surface for establishing periodic strains at the surface of said material for producing thereat a spatially varying change in the index of refraction for effecting a passing of light through the interface and thereupon along said secondary optical path stemming from said second surface.

9. The invention as set forth in claim 8 wherein f. said light reflection control means is a spatially periodic interdigital electrode assembly having means for connecting an electrical potential thereto from said source, electrodes of said assembly being adjacent the surface of said material at said second surface;

g. a film of light conducting material intermediate said second surface and the electrodes adjacent thereto and intimately joined therewith, said film having a predetermined thickness dimension and an index of refraction lower than the index of said material to which it is joined and means for extending a spatially varying change in the index of refraction thereof upon said establishing of periodic strains at the surface of said material.

10. A piezoelectric optical material light guide and light beam distributor means, comprising:

a. said light guide presenting a light admitting surface;

b. a source of light and means for directing light therefrom along an input path toward said admitting surface and thereupon along a primary optical path while undergoing a series of light reflections within said light guide so as to establish an availability of light from said source at a plurality of predetermined light output positions of said light guide for an optically controlled redirecting of light along a selected one of a plurality of secondary optical paths stemming from said output positions;

c. said means including an array of light reflecting interfaces of first and second light conducting media presenting, respectively, first and second indices of refraction, each of said interfaces presenting a length dimension and each angularly oriented so as to establish an optical relationship one with respect to the other, with respect to said input path, and with respect to each said secondary optical path, said array of interfaces providing a series of 360° primary optical paths for said light, each said 360° path displaced one with respect to the other in a side-by-side relationship in the direction of said length dimension;

d. said output positions extended along said length dimension adjacent a predetermined one of said interfaces of first and second light conducting media of said array of interfaces, light reflection control means supported in a light reflection control relationship with said one interface for establishing a spatially varying change of index of refraction in said light guide material for effecting, selectively, a passing of light along a secondary path stemming from a correspondng one of of said output positions.

* * * * *